UNITED STATES PATENT OFFICE 2,544,825

ADDITION SALTS OF CHLOROMETHYL DERIVATIVES OF VAT DYESTUFFS AND METHOD OF MAKING SAME

Samuel Coffey, Norman Hulton Haddock, Frank Lodge, James Wardleworth, and Clifford Wood, Blackley, Manchester, England, assignors to Imperial Chemical Industries Limited, a corporation of Great Britain No Drawing. Application July 1, 1947, Serial No. 758,468. In Great Britain July 3, 1946

11 Claims. (Cl. 260—351)

This invention relates to the manufacture of new dyestuffs and more particularly it relates to the manufacture of new dyestuffs from the halogenomethyl derivatives of certain compounds of the anthraquinone series and related types.

The compounds of the anthraquinone series and related types referred to in this specification are the coloured compounds which may be represented by the formula

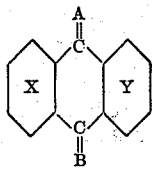

wherein A and B may be the same or different and may be carbon, nitrogen or sulphur atoms which form part of one or more ring systems condensed with one or both of the phenylene nuclei X and Y, or may be oxygen atoms, and wherein the phenylene nuclei X and Y may carry further substituents other than sulphonic or carboxylic acid groups, or may carry rings condensed with two adjacent carbon atoms of X or Y, provided that when the number of aromatic and quinonoid rings in the condensed ring system is less than 6 then a heterocyclic ring which forms part of the condensed ring system must carry at least one pendent aryl nucleus (free from sulphonic or carboxylic acid groups) connected directly, or X or Y or any of the condensed rings must carry at least one pendent aryl nucleus (free from sulphonic or carboxylic acid groups) connected through an —O—, —S—, —NH—, —NH—CO— or —CO—NH— linkage.

According to our invention we provide a process for the manufacture of new dyestuffs by treating compounds of the anthraquinone series and related types as hereinbefore defined which carry one or more chloromethyl or bromomethyl groups by known methods for replacing the chlorine or bromine atoms of chloromethyl or bromomethyl groups by quaternary or ternary salt groups.

Examples of starting materials which may be used in this invention include mono- and bis-(chloromethyl) - acedianthrone bis - (chloromethyl - dibenzanthrone, bis - (chloromethyl) - isodibenzanthrone, chlormethylindanthrone, the chloromethyl derivative of 8:17-di-p-toluidino-indanthrone, the bis-chloromethyl derivative of 2:8 - diphenyl - 1′:2′(N):5′:6′(N) - anthraquinonedithiazole and bis - (chloromethyl) - 1:4 - di-anilino-, 1:4 - di - p - toluidino- and 1:4 - di - m - xylidino - anthraquinone, bis - (chloromethyl) - perylene - 3:4:9:10- tetracarboxy -di- (phenylimide).

The starting materials for use in this invention may be made by reacting the compounds of the anthraquinone series and related types with dichloro- or dibromodimethyl ether in the presence of a condensing agent such as for example sulphuric acid.

As said above the chlorine and bromine atoms of the chlormethyl and bromomethyl groups may be replaced by known methods by ternary or quaternary salt groups. Examples of suitable methods are:

(1) Heating the chloro- or bromo-methyl derivative with a tertiary amine, for example, pyridine, triethylamine or dimethylcyclohexylamine.

(2) Causing the chloro- or bromo-methyl derivative to react with an alkali metal derivative of a mercaptan and then treating the so-obtained sulphide with such an ester as is known to convert sulphides into ternary sulphonium salts, for example with dimethyl sulphate or methyl p-toluenesulphonate. Suitable mercaptans which may be used in this process include for example methyl mercaptan, n-butyl mercaptan, cyclohexyl mercaptan, benzyl mercaptan, thiophenol and p-thiocresol.

(3) Causing the chloro- or bromo-methyl derivatives to react with a thiourea so as to convert it into an isothiouronium salt. Suitable thioureas which may be used for this purpose include thiourea, N-methylthiourea, N-phenylthiourea, N:N′-dimethylthiourea, N:N-dimethylthiourea, N:N:N′-trimethylthiourea, and tetramethylthiourea.

(4) Causing the chloro- or bromo-methyl derivative to react with thiourea, treating the product with alkali, reacting the alkali metal salt of the mercaptomethyl derivative so obtained with a dialkyl sulphate to form the alkyl sulphide and reacting the alkyl sulphide with dimethyl sulphate or methyl p-toluenesulphonate to form the ternary sulphonium salt.

By the process of this invention the chloro- or bromomethyl derivatives of compounds of the anthraquinone series and related types as hereinbefore defined may be converted into water soluble compounds which can be used as direct dyestuffs for cellulosic fibres. The solubility of the products in water is dependent on the number of quaternary or ternary salt groups introduced into the molecule which is itself dependent on the number of chloro- or bromo-methyl groups in the starting material.

The new dyestuffs dye animal and cellulosic fibres from neutral, slightly acid or slightly alkaline solutions.

The invention is illustrated but not limited by the following examples in which the parts are by weight.

Example 1

100 parts of bis-(chloromethyl)-dibenzanthrone (obtained by the action of dichlorodimethyl ether on dibenzanthrone in the presence of sulphuric acid) are added to a mixture of 200 parts of tetramethylthiourea and 500 parts of water which is stirred at 50°–70° C. The mixture is heated to 90° C. and stirred at this temperature for 1 hour. The deep violet-blue solution so obtained is cooled to 60° C. and diluted with 2000 parts of acetone. The solid so precipitated is filtered off at 20°–25° C., washed with acetone and dried below 60° C. The product is thus obtained as a violet blue powder which dissolves in water to give a deep blue solution and in concentrated sulphuric acid to give a purple solution. The product dyes cellulosic fibres in reddish blue to navy blue shades of good fastness properties. The products of this example may be represented by the following structural formula:

Example 2

30 parts of bis-(chloromethyl)-isodibenzanthrone (obtained by the action of dichlorodimethyl ether on isodibenzanthrone in the presence of sulphuric acid), 45 parts of tetramethylthiourea and 150 parts of water are stirred at 95°–100° C. for 1 hour when a violet solution is formed. 2000 parts of water are added to dilute the mixture. The product which is precipitated by adding 100 parts of salt at 40° C. and cooling to 20° C., is filtered off, washed with 5% salt solution and finally dried below 60° C. The violet powder thus obtained is soluble in hot water to give a bright violet solution from which cellulosic fibres can be dyed in fast violet shades. The products of this example may be represented by the following structural formula:

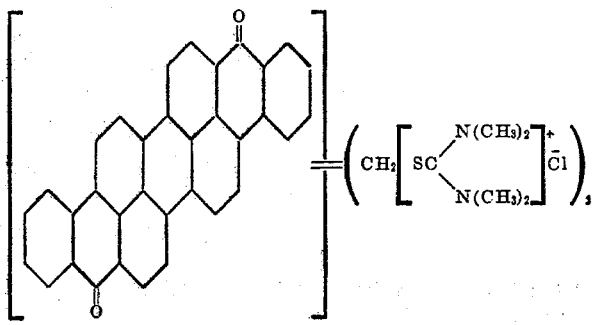

Example 3

50 parts of mono-(chloromethyl)-acedianthrone (obtained by the action of dichlorodimethylether on acedianthrone in the presence of sulphuric acid) 150 parts of tetramethylthiourea and 150 parts of water are heated and stirred at 90°–95° C. for ½ hour. The mixture is cooled to 70° C., 750 parts of acetone are added and the suspended product is filtered off, washed with acetone and dried below 60° C. The violet brown powder so obtained dissolves in hot water to give a bright reddish brown solution from which cellulosic fibres may be dyed in fast brown shades.

In similar manner, bis-(chloromethyl)-acedianthrone (which may be obtained by the action of dichlorodimethylether on acedianthrone in the presence of sulphuric acid) may be converted into a water-soluble salt which dyes cotton in fast brown shades. The products of this example may be represented by the following structural formula:

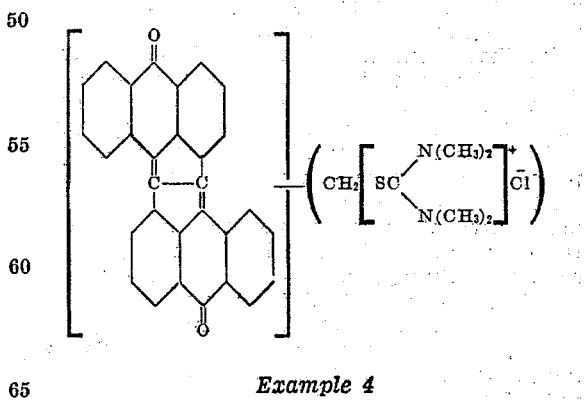

Example 4

80 parts bis-(chloromethyl)-acedianthrone 240 parts of thiourea and 240 parts of water are stirred at 80°–90° C. for 15 minutes. The mixture is cooled to 50° C., 2000 parts of acetone are added and the suspended isothiouronium salt is filtered off, washed with acetone and dried at 60° C. The red-brown powder so obtained dissolves in water to give a clear reddish brown solution from which cellulosic fibres can be dyed in reddish brown shades.

In a similar manner bis-(chloromethyl)-dibenzanthrone can be converted into an isothiouronium salt which is a reddish-blue dyestuff and bis-(chloromethyl)-isodibenzanthrone can be converted into an isothiouronium salt which is a violet dyestuff. The products of this example may be represented by the following structural formula:

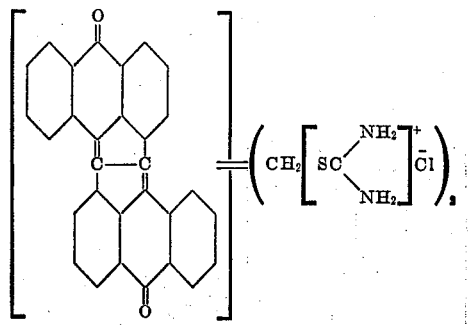

*Example 5*

10 parts of bis-(chloromethyl)-isodibenzanthrone are mixed with 50 parts of the monoethyl ether of ethylene glycol and the mixture is milled for 6 hours to yield a finely divided suspension and a further 40 parts of the monoethyl ether of ethylene glycol are then added. The suspension thus obtained is stirred at room temperature and 50 parts of a 10% alcoholic solution of sodium methylmercaptide are added. The mixture is stirred at 60–65° C. for 6 hours and 5 parts of sodium m-nitrobenzenesulphonate are then added to oxidise any leuco compound which may have been formed. The solid suspension is filtered off, washed with water and dried. The methylmercapto-methyl-isodibenzanthrone so obtained is a violet powder which dissolves in hot nitrobenzene to give a blue solution having a reddish fluorescence and in concentrated sulphuric acid to give a green solution.

For conversion into a water-soluble sulphonium salt, 5 parts of methylmercaptomethyl-isodibenzanthrone milled with 65 parts of dimethylsulphate at room temperature for 18 hours and the mixture is then diluted with 250 parts of acetone. The product is filtered off and washed with acetone until free from dimethyl sulphate. It is dried at room temperature when a dark violet powder is obtained which is sparingly soluble in cold but soluble in hot water to give a violet solution from which cellulosic fibres can be dyed in violet shades. The products of this example may be represented by the following structural formula:

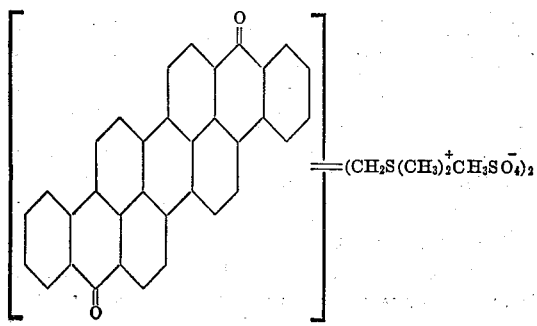

*Example 6*

10 parts of the isothiouronium salt of bis-(chloromethyl)-isodibenzanthrone (prepared as described in Example 4) are stirred with 200 parts of water and the mixture is heated to 90°–95° C. A current of nitrogen is passed over the mixture and 30 parts of a 32% aqueous solution of caustic soda are added. The mixture is stirred for 15 minutes at 90°–95° C. and cooled to 50° C. 7 parts of dimethyl sulphate are then added during 15 minutes and the mixture is stirred at 50°–55° C. for ½ hour. 5 parts of sodium m-nitrobenzenesulphonate are added and the mixture stirred a few minutes, and then filtered. The residue on the filter is washed with hot water. The methyl-mercaptomethyl-isodibenzanthrone thus obtained is then converted into its water-soluble sulphonium salt by the method described in Example 5. The products of this example may be represented by the following structural formula:

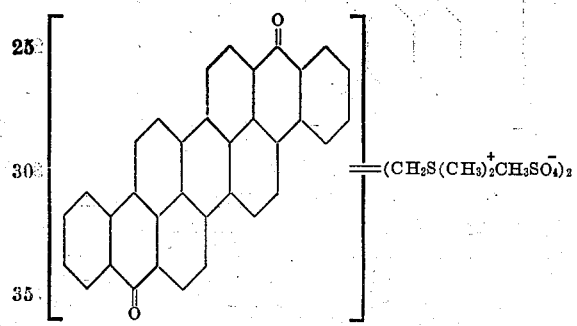

*Example 7*

20 parts of bis-(chloromethyl)-dibenzanthrone and 200 parts of dry pyridine are stirred and boiled under reflux for 3 hours. The mixture is cooled and filtered, and the residue on the filter is washed with benzene until free from pyridine and then dried below 60° C. A dark blue powder is thus obtained which dissolves in water to give a deep reddish blue solution from which cellulosic fibres may be dyed in blue shades of good fastness properties.

In a similar manner bis-(chloromethyl)-isodibenzanthrone can be converted into a water-soluble pyridinium salt which dyes cellulosic fibres in violet shades. The products of this example may be represented by the following structural formula:

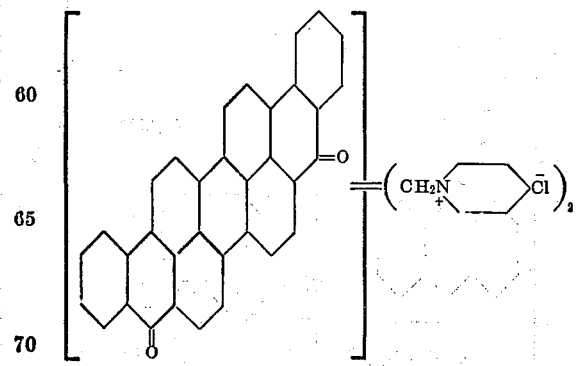

*Example 8*

50 parts of bis-(chloromethyl)-acedianthrone are stirred with 250 parts of the monoethyl ether of ethylene glycol and 30 parts of triethylamine are added. The mixture is then heated to 110-115° C. for 4 hours, cooled to 50° C., diluted with 2000 parts of water and filtered. The filtered solution is stirred at 60°-70° C. and 200 parts of salt are added, the mixture is cooled and the precipitated product is filtered off, washed with 10% salt solution and dried at room temperature. The product so obtained is a dark brown powder which dissolves in hot water to give a clear reddish brown solution from which cellulosic material is dyed fast reddish brown shades. The products of this example may be represented by the following structural formula:

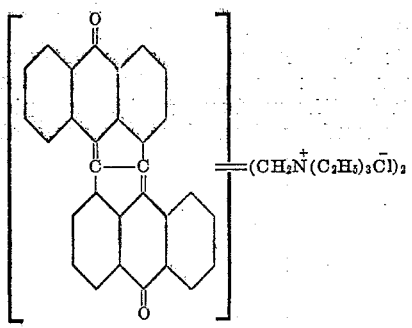

Example 9

50 parts of bis-(chloromethyl)-acedianthrone, and 400 parts of the monoethylether of ethylene glycol are milled for 2 hours and the suspension is then heated with 50 parts of dimethylcyclohexylamine at 95°-100° C. for 1 hour, when a clear reddish brown solution is obtained. The product is isolated by diluting with 3500 parts of water, adding 350 parts of salt to the mixture at 50°-55° C., filtering at 20°-25° C. and washing with 5% salt solution. It is dried at room temperature when a dark brown powder is obtained which dissolves in water to give a clear reddish brown solution from which cellulosic fibres are dyed in attractive brown shades. The products of this example may be represented by the following structural formula:

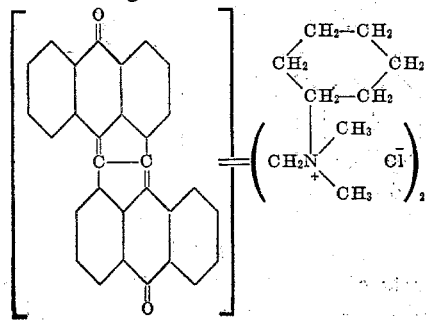

Example 10

20 parts of finely powdered mono-(chloromethyl)-acedianthrone and 200 parts of dry pyridine are stirred and boiled gently under reflux conditions for 3 hours. The mixture is cooled to 20°-25° C. the suspended dark brown pyridinium salt is filtered off, washed with benzene and dried below 60° C. The product is a reddish brown powder soluble in hot water to give a reddish brown solution from which cellulosic fibres are dyed in fast brown shades.

In the similar manner bis-(chloromethyl)-acedianthrone yields a reddish brown dyestuff. The products of this example may be represented by the following structural formula:

Example 11

50 parts of chloromethyl indanthrone (obtained by the action of dichlorodimethylether on indanthrone in the presence of sulphuric acid), 300 parts of water and 150 parts of tetramethylthiourea are stirred and heated at 95°-100° C. for 1 hour. The mixture is cooled to 60° C. diluted with 1500 parts of acetone and filtered cold and the residue on the filter is washed with acetone and dried at 25°-30° C. The dark blue powder so obtained dissolves in hot water to give a clear blue solution from which cotton is dyed a fast blue shade. The products of this example may be represented by the following structural formula:

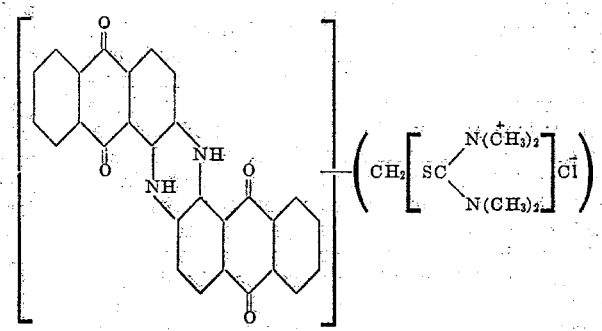

Example 12

20 parts of the chloromethylated derivative of 8:17-di-p-toluidinoindanthrone (obtained by the action of dichlorodimethyl ether on 8:17-di-p-toluidinoindanthrone in the presence of sulphuric acid) and 100 parts of tetramethylthiourea are ground together and heated at 100° C. for 1 hour. The mixture is cooled to 60° C. and 1000 parts of acetone are added and the product is filtered off, washed with acetone and dried at 60° C. The dark green product so obtained dissolves in hot water to give a deep green solution from which cellulosic fibres are dyed in fast olive green shades.

In a similar manner, by heating the chloromethyl - 8:17 - di - p - toluidinoindanthrone with dry pyridine the water-soluble pyridinium salt is obtained. The products of this example may be represented by the following structural formula:

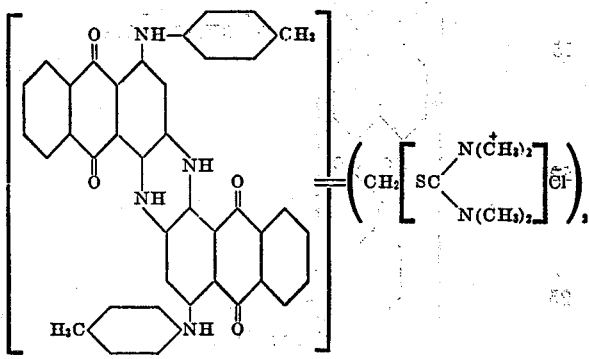

Example 13

60 parts of the bis-chloromethyl derivative of 2:8 - diphenyl - 1':2'(N)5':6'(N) - anthraquinonedithiazole (obtained by the action of dichlorodimethyl ether on 2:8 - diphenyl-1':2'(N):5':6' - (N) - anthraquinonedithiazole in the presence of sulphuric acid) and 240 parts of tetramethylthiourea are ground together and stirred at 100° C. for 1 hour. The mixture is cooled to 60° C. and 2000 parts of acetone are added. The product is filtered off, washed with acetone and dried. The yellow brown powder so obtained dissolves in hot water to give a yellow solution from which cotton is dyed direct in fast yellow shades. The products of this example may be represented by the following structural formula:

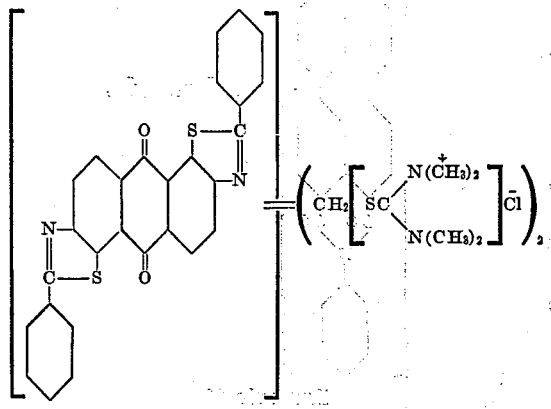

Example 14

20 parts of bis-(chloromethyl)-1:4-dianilinoanthraquinone (obtained by the action of dichlorodimethyl ether on 1:4-dianilinoanthraquinone) and 200 parts of dry pyridine are stirred at 95°-100° C. for 1 hour. The mixture is then cooled to 20° C. and the precipitated pyridinium salt is filtered off and washed with benzene. The dried product is a green powder which gives a clear bluish green solution in water. The products of this example may be represented by the following structural formula:

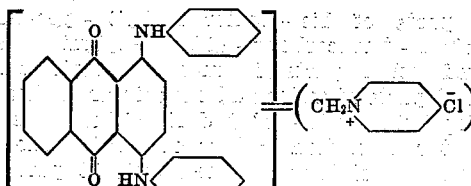

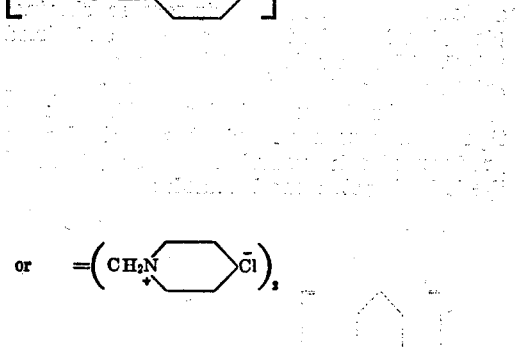

Example 15

5 parts of bis - (chloromethyl) - perylene- 3:4:9:10 - tetracarboxy - di - (phenylimide) are added to 100 parts of pyridine and the mixture is stirred and boiled for 10 minutes. The suspension is diluted with 200 parts of acetone and the red solid is filtered off, washed with acetone, and dried at 60° C. The new dyestuff is thus obtained as a bright red powder.

It dissolves in water to give a bright red solution with a yellow fluorescence, and the hot solution dyes cotton in bright red shades.

The bis - (chloromethyl) - perylene - 3:4:9:10- tetracarboxy-di-(phenylimide) employed in the above example may be made by treating perylene- 3:4:9:10 - tetracarboxy - di - (phenylimide) with sym-dichlorodimethyl ether in the presence of surfuric acid or in the presence of aluminium chloride and triethylamine. The products of this example may be represented by the following structural formula:

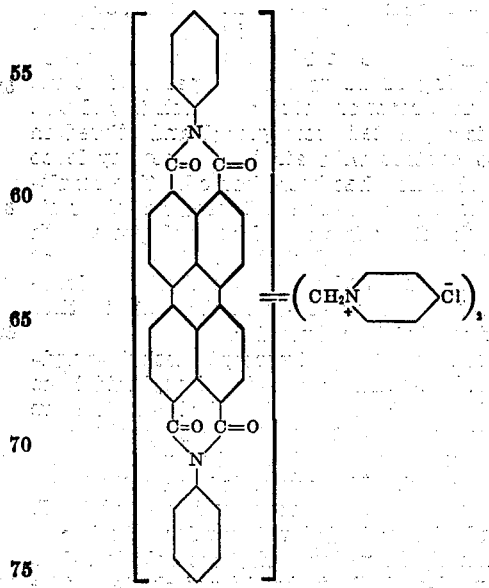

Example 16

5 parts of bis-(chloromethyl)-perylene-3:4:9:10-tetracarboxy-di-(phenylimide) are mixed with 12 parts of sym-tetramethylthiourea and 12 parts of water and the mixture is heated with stirring at 90°–95° C. during 15 minutes. A bright red solution is thus obtained. The solution is cooled and diluted with 50 parts of acetone and the red precipitate so obtained is filtered off, washed with acetone and dried at 60° C. The new dyestuff is thus obtained as a bright red powder. It dissolves readily in water to give a bright red solution and the hot solution dyes cotton in bright red shades. The products of this example may be represented by the following structural formula:

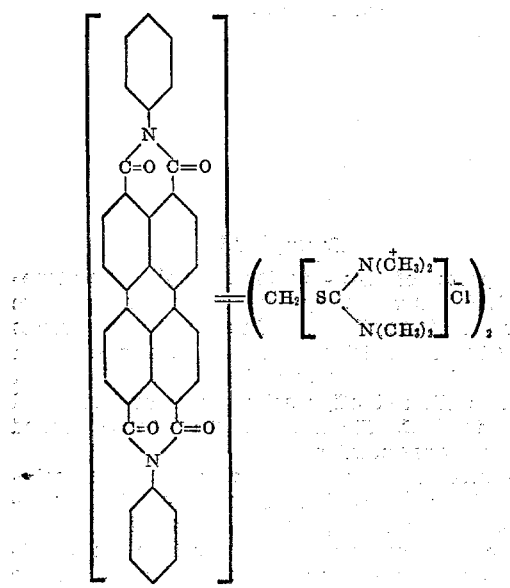

Example 17

5 parts of bis-(chloromethyl)-perylene-3:4:9:10-tetracarboxy-di-(phenylimide), 30 parts of ethanol and a solution of 2.2 parts of sodium methyl mercaptide in 15 parts of methanol are milled during 16 hours with 40 parts of coarse gravel. The reaction mixture, which is violet in colour, is separated from gravel and stirred in order to contact with air to oxidise any leuco compound which has been formed. The resulting bright red suspension is filtered and the residue on the filter is washed several times with water and then with alcohol, and finally dried at 60° C. Bis-(methylmercaptomethyl)-perylene-3:4:9:10-tetracarboxy-di-(phenylimide) is thus obtained as a bright red powder.

5 parts of bis-(methylmercaptomethyl)-perylene-3:4:9:10-tetracarboxy-di-(phenylimide) so obtained and 30 parts of dimethyl sulphate are heated together at 90°–95° C. during 15 minutes. The mixture is then cooled and 70 parts of acetone are added. The suspended red solid is filtered off, washed with acetone and dried at 60° C. The product is a bright red powder, which dissolves readily in water. The hot solution dyes cotton, wool and silk in bright red shades. The products of this example may be represented by the following structural formula:

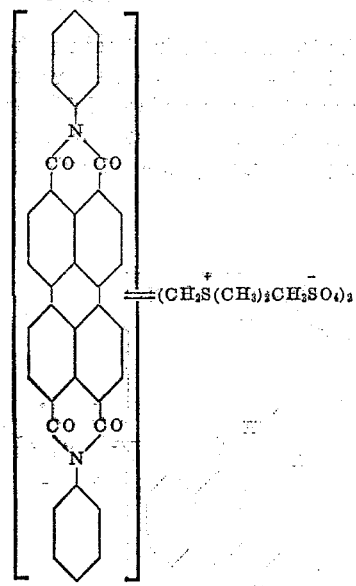

Example 18

5 parts of bis-(chloromethyl)-perylene-3:4:9:10-tetracarboxy-di-(phenylimide) are mixed with 3.7 parts of triethylamine and 50 parts of benzyl alcohol and the mixture is stirred and refluxed for about half an hour. The suspension is diluted with acetone and the red solid is filtered off, washed with acetone and dried at 60° C. The product, which is obtained as a bright red powder, is soluble in water and the hot solution dyes cotton in bright red shades. The products of this example may be represented by the following structural formula:

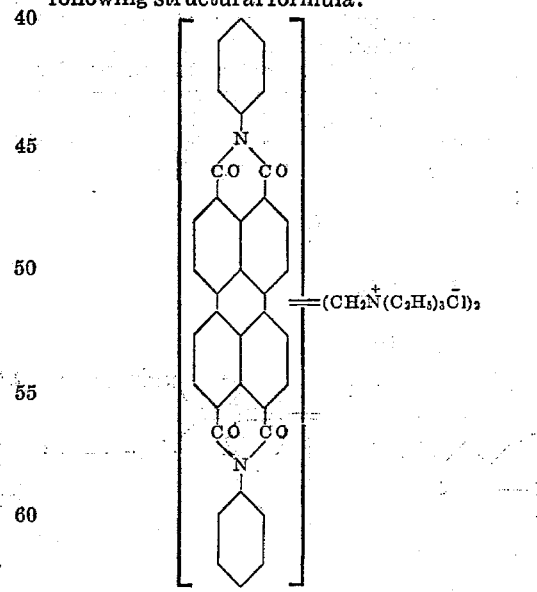

Example 19

5 parts of bis-(butylmercaptomethyl)-perylene-3:4:9:10-tetracarboxy-di-(phenylimide) (obtained as described below) and 30 parts of dimethyl sulphate are heated together with stirring at 90°–95° C. for 30 minutes. The mixture is cooled and diluted with acetone. The red solid in suspension is filtered off, washed with acetone and dried at 60° C. The product is a bright red powder and is soluble in water. The hot solution dyes cotton in bright red shades. The di-(butylmercaptomethyl)-perylene-3:4:9:10-tetracarboxy-di-(phenylimide) may be made as follows:

5 parts of bis - (chloromethyl) - perylene - 3:4:9:10 - tetracarboxy - di - (phenylimide) are added to a solution of 0.72 part of sodium in 20 parts of ethanol and then 2.8 parts of n-butyl-mercaptan are added. The resulting mixture is milled during 20 hours with 40 parts of coarse gravel. The reaction mixture is separated from the gravel and stirred to oxidise any leuco compound present. The suspension is filtered and the residue on the filter washed with water and then with ethanol and dried at 60° C. The product is thus obtained as a bright red powder. The products of this example may be represented by the following structural formula:

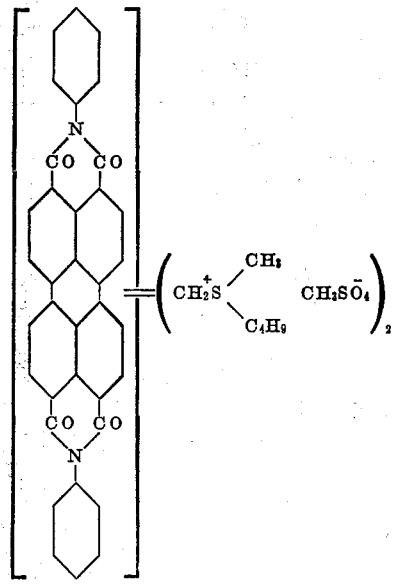

Example 20

Instead of 5 parts of bis-(butylmercapto-methyl) - perylene - 3:4:9:10 - tetracarboxy-di-(phenylimide) used in Example 19 there are used 5 parts of di-(benzylmercaptomethyl)-perylene-3:4:9:10 - tetracarboxy-di-(phenylimide), (prepared by the method described in Example 19 for the corresponding butyl compound but using 3.9 parts of benzylmercaptan instead of the 2.8 parts of n-butylmercaptan). A similar product is obtained to that of Example 19. The products of this example may be represented by the following structural formula:

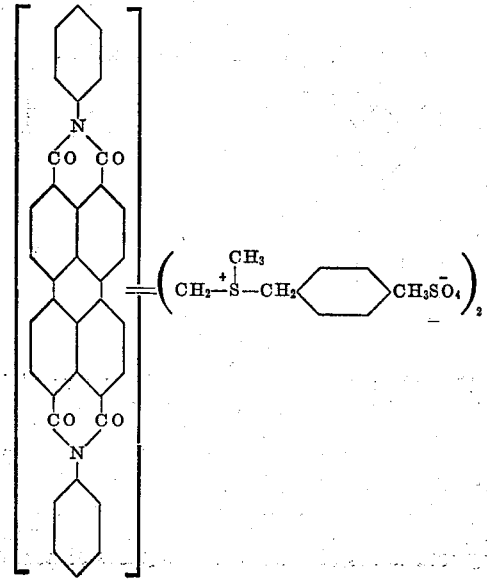

Example 21

Instead of 5 parts of bis-(butylmercapto-methyl) - perylene - 3:4:9:10 - tetracarboxy-di-(phenylimide) used in Example 19 there are used 5 parts of bis-(p-thiocresylmercaptomethyl)-perylene - 3:4:9:10-tetracarboxy - di - (phenylimide) (prepared by the method described in Example 19 for the corresponding butyl compound but using 3.9 parts of p-thiocresol instead of 2.8 parts of n-butyl mercaptan). A product is obtained having similar dyeing properties to those of the product of Example 19. The products of this example may be represented by the following structural formula:

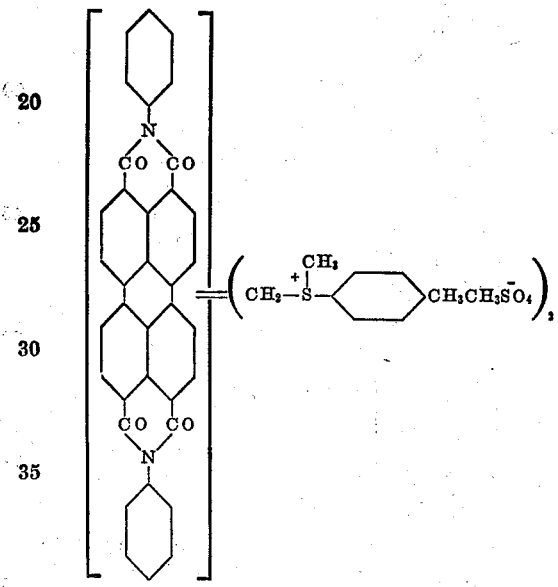

Example 22

5 parts of bis-(methylmercaptomethyl)-perylene 3:4:9:10 - tetracarboxy - di - (phenylimide) made by the process described in Example 17, are heated at 90–95° C. for about 20 minutes with 30 parts of methyl-p-toluenesulphonate. The product is isolated as described for the dyestuff of Example 17. The product is a bright-red powder, whose solution in water dyes cotton in bright red shades. The products of this example may be represented by the following structural formula:

Example 23

5 parts of bis - (chloromethyl) - perylene-3:4:9:10 - tetracarboxy - di - (phenylimide) are heated with 12 parts of thiourea and 12 parts of water with stirring at 90–95° C. during 15 minutes. The product is isolated as described in Example 16 as a bright red powder which is readily soluble in water giving a solution which dyes cotton in bright red shades. The products of this example may be represented by the following structural formula:

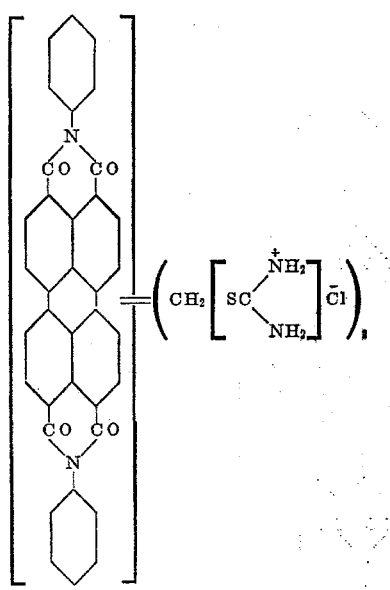

Example 24

Instead of the 12 parts of thiourea used in Example 23 there are used 12 parts of sym-N:N'-dimethylthiourea. A similar product is obtained which is likewise readily soluble in water. The hot solution dyes cotton in bright red shades. The products of this example may be represented by the following structural formula:

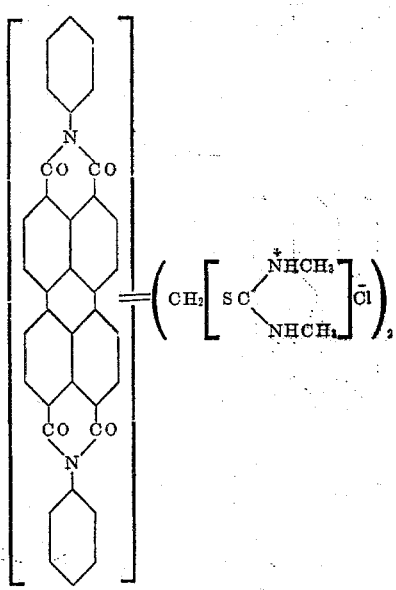

Example 25

5 parts of bis - (chloromethyl) - perylene-3:4:9:10 - tetracarboxy - di - (o-tolylimide) are mixed with 12 parts of tetramethylthiourea and 12 parts of water and heated at 90–95° C. for 15 minutes and the product is isolated as described in Example 16. The product is soluble in water to give a bright red solution with a yellowish fluorescence, and the hot solution dyes cotton in bright red shades. The products of this example may be represented by the following structural formula:

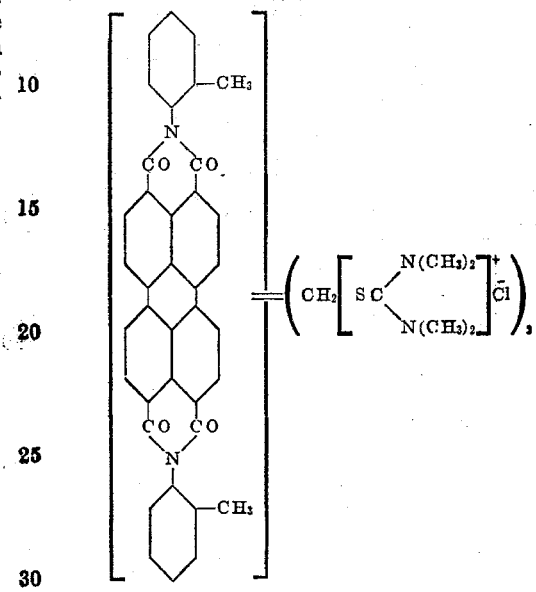

Example 26

Instead of the 5 parts of bis-(chloromethyl)-perylene - 3:4:9:10 - tetracarboxy - di - (o-tolylimide) used in Example 25, there are used 5 parts of bis-(chloromethyl)-perylene-3:4:9:10-tetracarboxy-di-(p-chlorophenylimide). A similar product is obtained and the aqueous solution dyes cotton in bright red shades. The products of this example may be represented by the following structural formula:

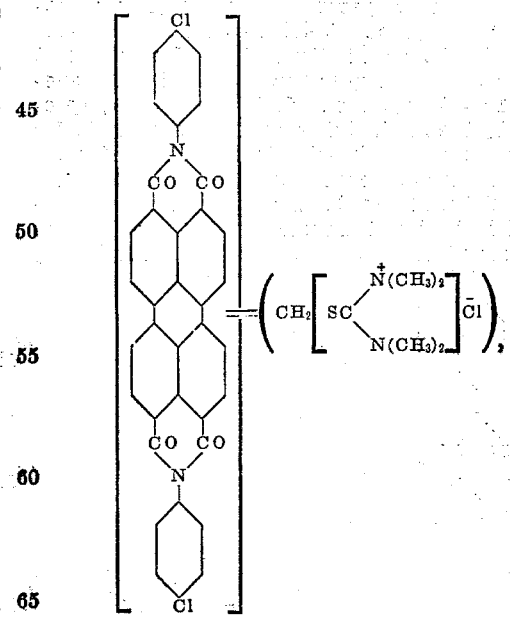

Example 27

45 parts of the chloromethyl derivative of 6-p-toluidino-2-phenyl-1':9'-anthrapyrimidine (obtained by the action of dichlorodimethylether on 6-p-toluidino-1':9'-anthrapyrimidine in 90% sulphuric acid at 45° C.), 120 parts of tetramethylthiourea and 150 parts of water are heated at 98–100° C. for 1 hour with stirring. The resulting solution is diluted with 500 parts of acetone;

the solid suspension is filtered off, washed with acetone and dried. The product is a bluish-red powder soluble in water to give a clear red solution in which cotton may be dyed, using sodium acetate as assistant, in fast pink shades. The products of this example may be represented by the following structural formula:

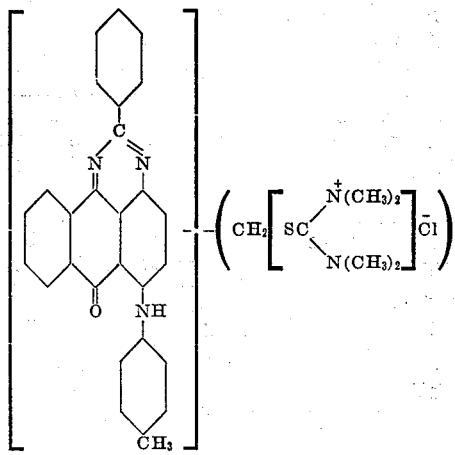

*Example 28*

5 parts of the chloromethyl derivative of 1:4-diamino-2-phenoxyanthraquinone (prepared by the action of dichlorodimethylether on 1:4-diamino-2-phenoxyanthraquinone in 90% sulphuric acid at 20–25° C.), 12 parts of tetramethylthiourea and 12 parts of water are stirred at 95° C. for 1 hour. This mixture is then diluted with 60 parts of acetone and the precipitated product is filtered off, washed with acetone and dried. The violet powder so obtained is readily soluble in hot water to give a clear purple solution which dyes cellulosic materials in violet shades. The products of this example may be represented by the following structural formula:

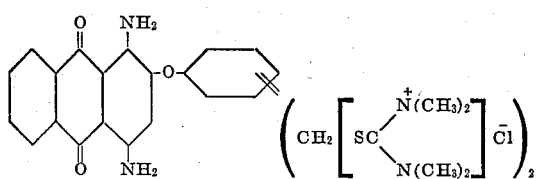

*Example 29*

20 parts of 1:4-bis-(m-chloromethylbenzoylamino)anthraquinone (obtained by reacting 1:4-diaminoanthraquinone with 2 molecular proportions of m-chloromethylbenzoyl chloride) and 300 parts of pyridine are stirred and boiled gently for 1 hour. The suspended product is filtered off cold, washed with benzene and acetone and dried at room temperature. The brownish-red powder obtained dissolves readily in hot water to a clear orange-red solution in which cotton may be dyed in reddish shades of good fastness properties.

The products of this example may be represented by the following structural formula:

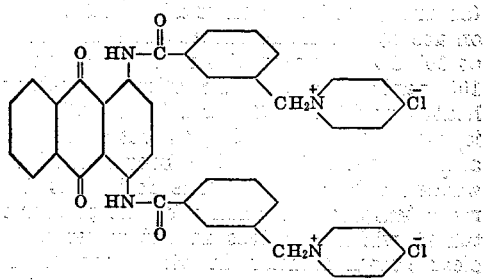

*Example 30*

50 parts of the chloromethyl derivative of 1:4-diamino-2:3-di-p-tolylmercaptoanthraquinone (obtained by the action of dichlorodimethylether on 1:4-diamino-2:3-di-p-tolylmercaptoanthraquinone in concentrated sulphuric acid at 60–65° C.), 50 parts of tetramethylthiourea and 100 parts of water are mixed and heated at 95–100° C. for 1 hour. After cooling to 60–65° C. acetone is added to dilute the mass and the suspended product filtered off, washed with acetone and dried at room temperature. The dark blue powder thus obtained yields a blue solution in hot water. The products of this example may be represented by the following structural formula:

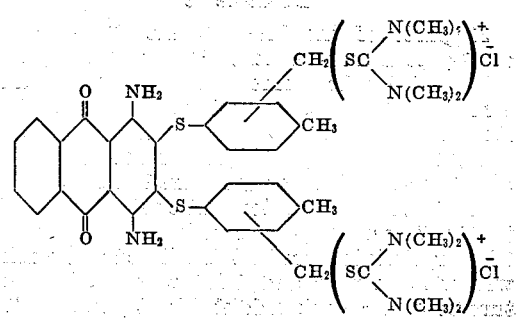

*Example 31*

20 parts of the chloromethyl derivative of 6-benzoylamino-1':2'-phthaloyl-5':6'-benzcarbazole (obtained by treating 6-benzoylamino-1':2'-phthaloyl-5':6'-benzcarbazole with dichlorodimethyl ether in 98% sulphuric acid at 50° C.), 20 parts of tetramethylthiourea and 50 parts of water are mixed and stirred at 95–100° C. for 1 hour. The mixture is cooled to 60° C. diluted with 500 parts of acetone, filtered and the residual brown solid washed well with acetone and dried at room temperature. The product forms a dark brown solution which dissolves in hot water to give a reddish brown solution which may be used for dyeing cellulosic fibres in fast brown shades. The products of this example may be represented by the following structural formula:

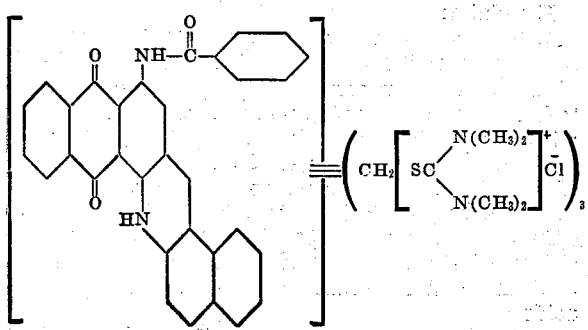

Example 32

30 parts of bis-(bromomethyl) acedianthrone (obtained by the action of dibromodimethylether on acedianthrone in concentrated sulphuric acid at 60° C.), 30 parts of tetramethylthiourea and 100 parts of water are stirred together and heated at 95–100° C. for 1 hour. The mixture is cooled to 60° C. diluted with 800 parts of acetone, filtered and the brown solid residue washed with acetone. The residue is dried at room temperature when a brown powder is obtained which dissolves in hot water to give a clear brown solution in which cotton may be dyed in fast brown shades. The products of this example may be represented by the following structural formula:

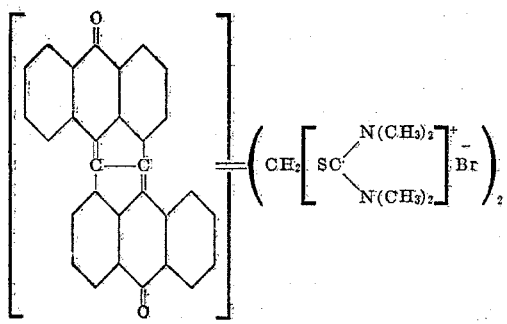

Example 33

20 parts of the bis-bromomethyl derivative of 6-p-toluidino-3-methyl-1':9'-anthrapyridone (obtained by bromomethylating 6-p-toluidino-3-methyl-1':9'-anthrapyridone with sym-dibromodimethylether in 98% sulphuric acid at 50° C. for 18 hours), 20 parts of tetramethylthiourea and 60 parts of water are mixed and stirred at 90–100° C. for 30 minutes. The mixture is cooled to 60° C., and 400 parts of acetone are added. The precipitated product is filtered off, washed well with acetone and dried at room temperature to give a dark reddish violet powder. The product gives a clear bluish-red solution in water from which cotton is dyed in very bluish red shades. The products of this example may be represented by the following structural formula:

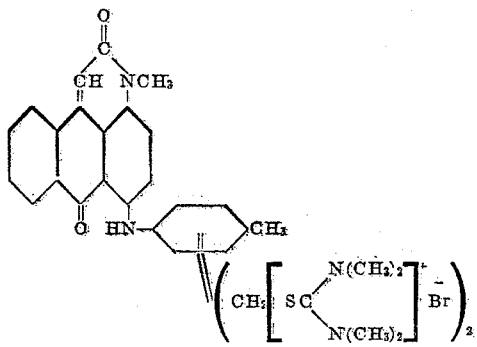

We claim:

1. Water-soluble derivatives of vat dyestuffs selected from the group consisting of the acedianthrone, dibenzanthrone, isodibenzanthrone, indanthrone and perylene-tetracarboxy-diphenylimide class vat dyestuffs characterized by having directly attached to one of the aromatic rings of the dyestuffs molecule at least one radical of the type —$CH_2X$ wherein X represents an onium salt radical selected from the group consisting of the sulphonium, isothiouronium and quaternary ammonium salts of water-soluble acids.

2. A water-soluble isodibenzanthrone dyestuff characterized by having directly attached to one of the aromatic rings thereof a methylene isothiouronium salt of a water-soluble acid.

3. A water-soluble perylene-tetracarboxy-di-(phenylimide) dyestuff characterized by having directly attached to one of the aromatic rings thereof a methylene isothiouronium salt of a water-soluble acid.

4. A water-soluble dibenzanthrone dyestuff characterized by having directly attached to one of the aromatic rings thereof a methylene isothiouronium salt of a water-soluble acid.

5. A water-soluble acedianthrone dyestuff characterized by having directly attached to one of the aromatic rings thereof a methylene isothiouronium salt of a water-soluble acid.

6. A water-soluble indanthrone dyestuff characterized by having directly attached to one of the aromatic rings thereof a methylene isothiouronium salt of a water-soluble acid.

7. In a process for producing water-soluble dyestuffs of the class selected from the group consisting of acedianthrone, dibenzanthrone, isodibenzanthrone, indanthrone and perylene-tetracarboxy-di-(phenylimide) type vat dyestuffs, the step which comprises reacting a vat dyestuff selected from the anthraquinone series and related types which contains in its molecular structure at least 6 condensed rings and which bears at least one methylene halide side chain selected from the group consisting of $CH_2Cl$ and $CH_2Br$, with a reagent selected from the group consisting of tertiary nitrogenous bases, thioureas, and alkali metal salts of mercaptans selected from the group consisting of alkyl, aralkyl and aryl mercaptans.

8. A process for the production of a water-soluble dyestuff having a dibenzanthrone radical in the dyestuff molecule which comprises reacting dibenzanthrone having at least one of the aromatic rings thereof substituted by at least one chloromethylene radical with a thiourea.

9. A process for the production of a water-soluble dyestuff having a acedianthrone radical in the dyestuff molecule which comprises reacting acedianthrone having at least one of the aromatic rings thereof substituted by at least one chloromethylene radical with a thiourea.

10. A process for the production of water-soluble dyestuff having an indanthrone radical in the dyestuff molecule which comprises reacting indanthrone having at least one of the aromatic rings thereof substituted by at least one chloromethylene radical with a thiourea.

11. A process for the production of a water-soluble dyestuff having an isodibenzanthrone radical in the dyestuff molecule which comprises reacting dibenzanthrone having at least one of the aromatic rings thereof substituted by at least one chloromethylene radical with a thiourea.

SAMUEL COFFEY.
NORMAN HULTON HADDOCK.
FRANK LODGE.
JAMES WARDLEWORTH.
CLIFFORD WOOD.

REFERENCES CITED

The following references are of record in the file of this patent:

UNITED STATES PATENTS

| Number | Name | Date |
|---|---|---|
| 2,164,784 | Rintelman et al | July 4, 1939 |
| 2,195,076 | Braun et al | Mar. 26, 1940 |
| 2,388,285 | Ratti | Nov. 6, 1945 |